W. BERND & L. W. BURDEN.
ADJUSTMENT DEVICE FOR QUACK GRASS PLOWS.
APPLICATION FILED MAY 26, 1914.
1,129,780.
Patented Feb. 23, 1915.
3 SHEETS—SHEET 1.
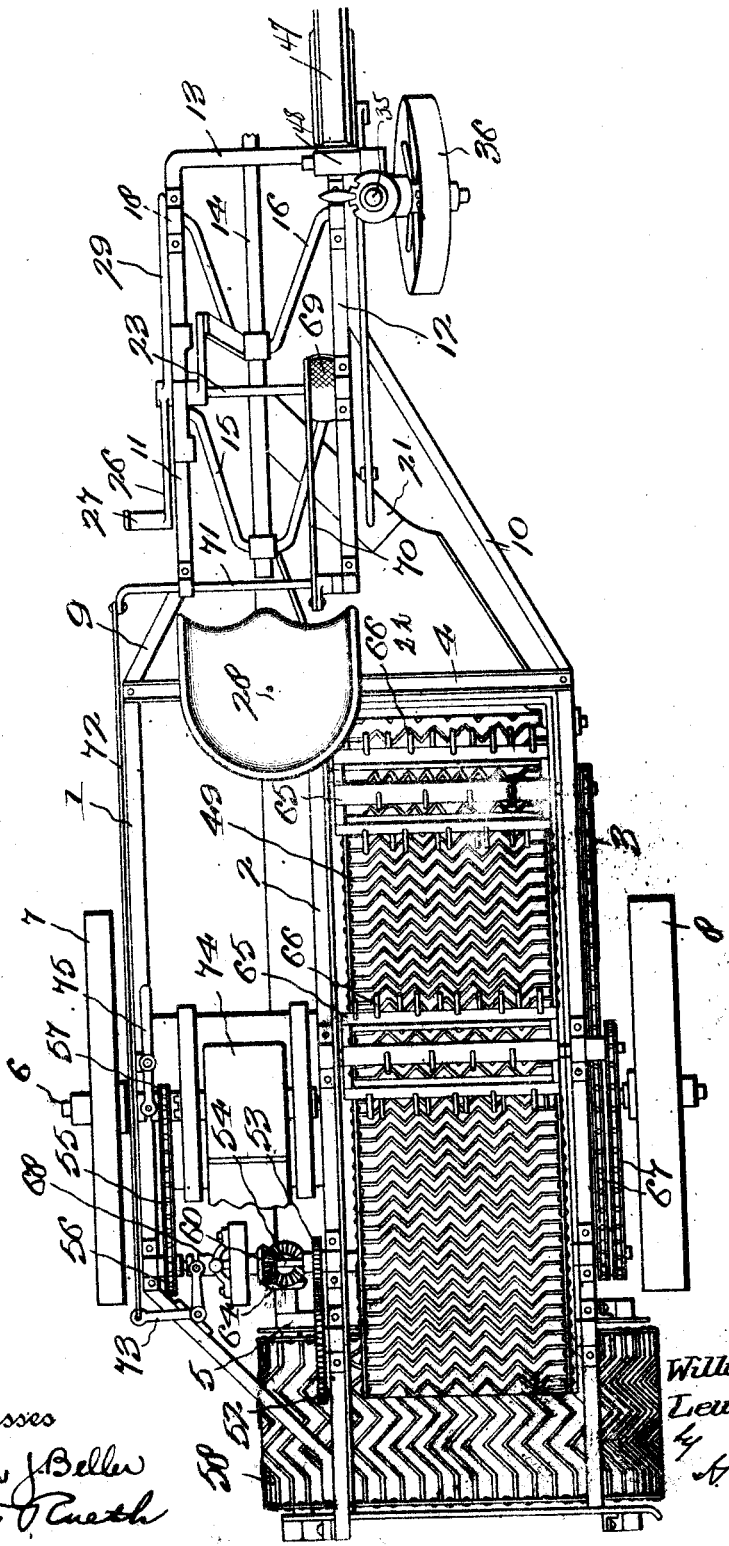

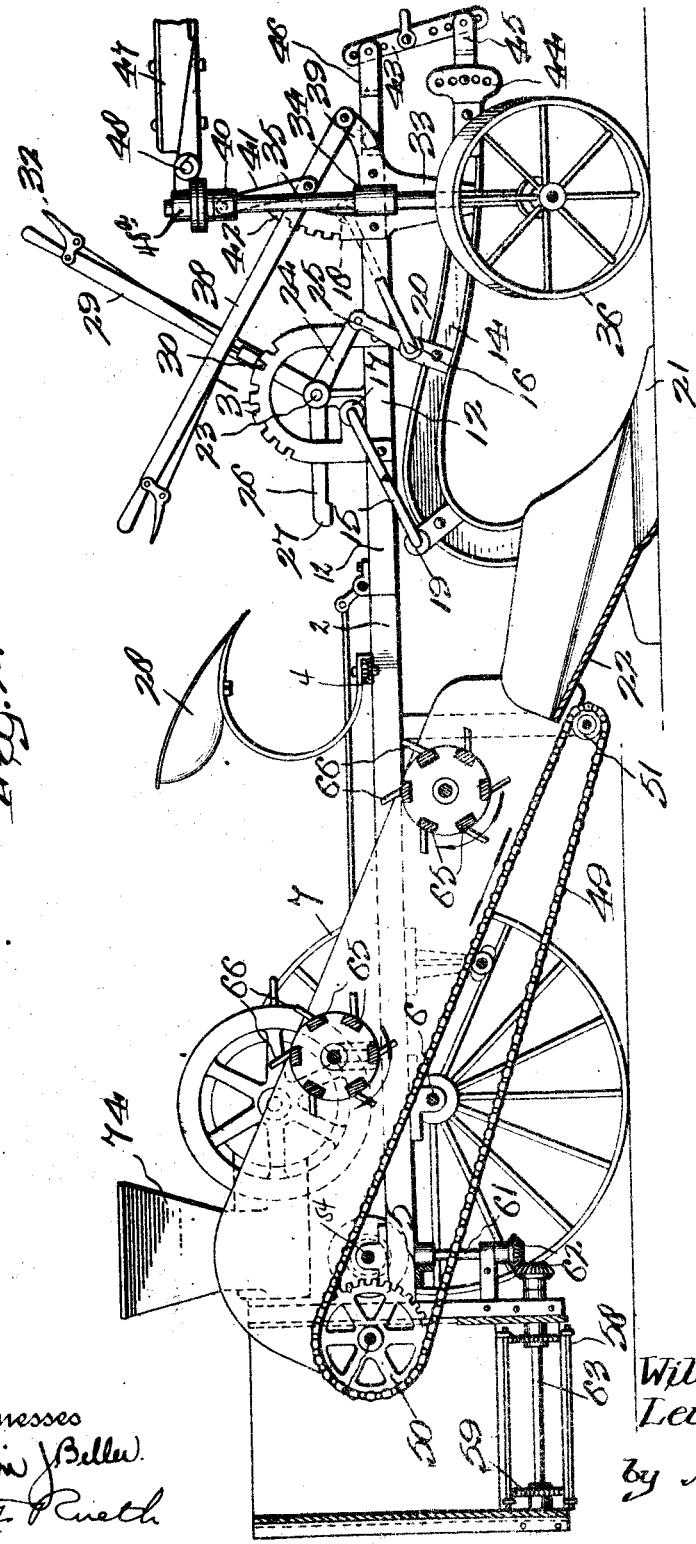

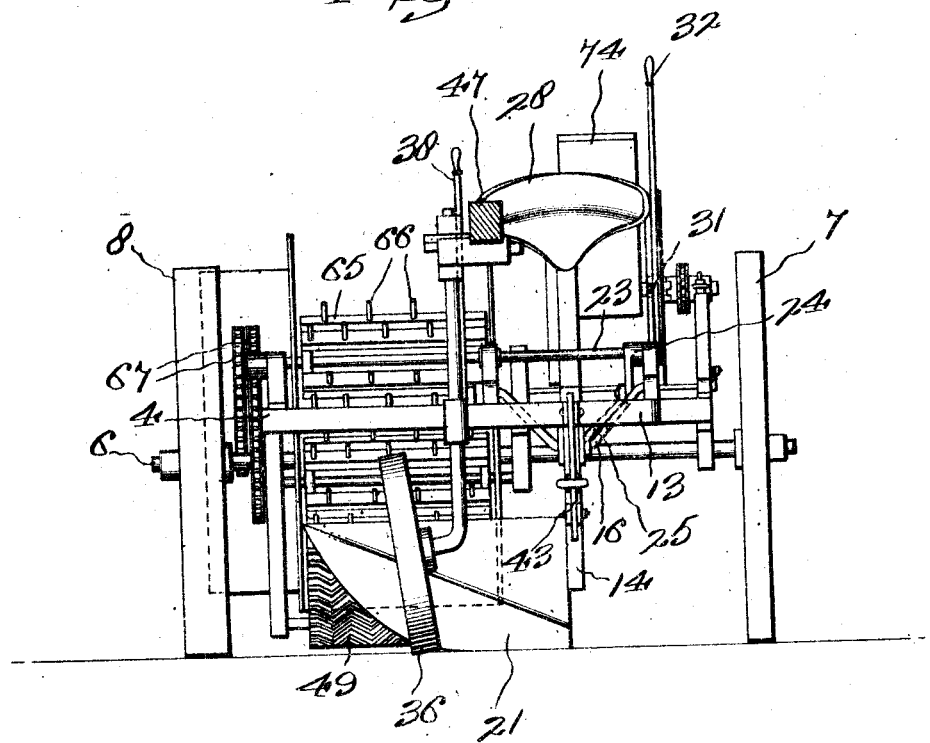

UNITED STATES PATENT OFFICE.

WILLIAM BERND AND LEWIS W. BURDEN, OF NEW RICHMOND, WISCONSIN.

ADJUSTMENT DEVICE FOR QUACK-GRASS PLOWS.

1,129,780.

Specification of Letters Patent. Patented Feb. 23, 1915.

Application filed May 26, 1914. Serial No. 840,990.

*To all whom it may concern:*

Be it known that we, WILLIAM BERND and LEWIS W. BURDEN, citizens of the United States of America, residing at New Richmond, in the county of St. Croix and State of Wisconsin, have invented certain new and useful Improvements in Adjustment Devices for Quack-Grass Plows, of which the following is a specification.

The present invention relates to agricultural implements and consists in the combinations and arrangements of parts hereinafter disclosed and particularly set forth in the accompanying claim.

The invention has for its purpose to provide an adjustment device for the steering wheel of quack grass plows which may be readily manipulated from the driver's seat, and which will be easy and positive in operation.

Other advantages of the invention will appear in the course of the following specification, and the appended drawings wherein:

Figure 1 is a top plan view of the implement. Fig. 2 is a side elevational view of the same, and Fig. 3 is a front elevational view thereof.

Referring to the construction in detail and wherein the same reference characters indicate corresponding parts in the different views shown, the implement comprises a frame constructed of longitudinal bars 1, 2 and 3 connected by the cross-bar 4 at the forward end and a similar cross-bar 5 adjacent the rear end. An axle 6 is suitably mounted on the frame and has journaled thereon ordinary tractor wheels 7 and 8. A secondary frame is secured to the main frame at the front end thereof by the angularly disposed bars 9 and 10 and consists of a pair of side bars 11 and 12, having a connecting cross-bar 13 (see Fig. 1).

A plow standard 14 is adjustably mounted on the secondary frame by means of a pair of runners or stirrups 15 and 16 that are swingingly mounted in suitable bearings 17 and 18 on said frame and have similar engagement with the plow standard as indicated at 19 and 20 in Fig. 2. A plow 21 is carried by the standard 14 after the usual manner and is provided with an ordinary mold board 22 that is disposed to deliver the unearthed material on to the sorter and conveyer as will be presently explained.

The means for adjusting the plow 21 for working at different depths, or for carrying the same clear of the ground, consist of a shaft 23 that is journaled in the frame bars 11 and 12 and has pivotal connection with the plow standard 14 by an arm 24 and a link 25. A lever 26 is fixed on the shaft 23 and carries a treadle 27 for engaging with the foot of the operator, who sits on the seat 28. A hand actuated lever 29 is likewise fixed to the shaft 23 and carries a pawl 30 for engaging with the rack 31 to hold the plow in set position as will be understood. The pawl 30 is disengaged by means of the hand release 32 after the ordinary manner.

A bracket arm 33 is secured to the frame bar 12 and has a sleeve 34 which receives a vertical shaft 35 that carries a caster or steering wheel 36 at its lower end. The frame is adjusted in different positions by means of a lever 38 fulcrumed on the bracket arm 39 and connected to the swiveled collar 40 on the shaft 35 by a link 41. A rack 42 is mounted on the frame and is adapted to be engaged by a pawl (not shown) carried by said lever 38 for securing the frame in its adjusted position, as with the lever 29.

The draft is connected to the implement by a cross-bar 43 secured to the clevis 44, through a link 45, and an end piece 46 on the frame. The tongue 47 for the steering wheel 36 is hingedly connected to the shaft 35 as shown at 48. Said hinge 48 is carried by a collar 48ᵃ secured on the shaft 35, and the collar 40 is swiveled on said collar 48 whereby the tongue 47 may be operated without interfering with the adjusting mechanism.

An endless conveyer 49 is mounted on the vehicle to receive the material from the mold board 22. Said conveyer travels on the large and small sprockets 50 and 51 and is driven by the pinion 52 from the pinion 53 on the shaft 54. The shaft 54 is in turn connected to be driven from the axle 6 by the chain and sprocket drive 55, 56 and 57. A second conveyer 58 is mounted on the vehicle frame and travels on pinions 59 (one pair being shown), after the manner of the conveyer 49. Said conveyer 58 is located to receive the material from the conveyer 49 and is driven from the shaft 54 through the miter gear 60, the shaft 61, and a second miter gear 62 connected to the sprocket shaft 63. A second drive for the conveyer 58 consists of a bevel gear 64 meshing with the miter gear 60 and connected to the shaft of the sprockets supporting the delivery end of the conveyer 58.

A pair of agitators or earth disintegrators is associated with the main conveyer 49 and consists each of a drum or cage 65 having a plurality of spikes or fingers 66 that are disposed to engage with the material being conveyed by the belt 49 and in so doing to beat up or agitate the same for loosening the earth adhering to the roots of grass that has been excavated by the plow. The two agitators or disintegrators are driven at any suitable speed, each by a chain and sprocket gearing 67, from the driving shaft 54 of the main conveyer.

The driving shaft 54 may be thrown into or out of operation by means of the clutch 68 that is actuated from the driver's seat by a treadle 69. The treadle 69 connects with the clutch 68 by a rod 70, the crank shaft 71, reach rod 72 and the bell crank lever 73 whose respective arms connect said reach rod and the shiftable clutch element.

The implement is equipped with a motor 74 of the internal combustion engine type that may be connected to drive the chain 55 by means of a clutch 75.

While we have shown and described a preferred construction of apparatus it will be understood that we are not limited to the precise details of structure disclosed but may make such changes as come within the scope of the claim.

Having thus described our invention what we claim as new and desire to protect by U. S. Letters Patent is:

In an agricultural implement the combination of a frame; tractor wheels supporting the frame; a bracket secured to the frame at the front end thereof and provided with a sleeve and an arm; a vertically disposed shaft passing freely through the sleeve of said bracket; a steering wheel mounted on said shaft at the lower end thereof; a collar fixedly mounted on said shaft at the upper end thereof; a tongue connected to the collar on said shaft; means for adjusting said frame relative to the steering wheel and tongue comprising a lever fulcrumed on the arm of the bracket, and a link connected to said lever and having swivel connection with said collar; and a device for securing the lever in different adjusted positions, substantially as described.

In testimony whereof we affix our signatures in presence of two witnesses.

WILLIAM BERND.
LEWIS W. BURDEN.

Witnesses:
W. T. DOAR,
E. GLEASON.